(12) United States Patent
Kelley et al.

(10) Patent No.: US 6,322,744 B1
(45) Date of Patent: Nov. 27, 2001

(54) LITHIUM MANGANESE OXIDE-BASED ACTIVE MATERIAL

(75) Inventors: Tracy E. Kelley, Henderson; Porter H. Mitchell, Las Vegas; Chariclea A. Scordilis-Kelley, Henderson, all of NV (US)

(73) Assignee: Valence Technology, Inc., Henderson, NV (US)

(*) Notice: Subject to any disclaimer, the term of this patent is extended or adjusted under 35 U.S.C. 154(b) by 0 days.

(21) Appl. No.: 09/251,296

(22) Filed: Feb. 17, 1999

(51) Int. Cl.[7] .............................. C01D 15/02; C01G 1/00
(52) U.S. Cl. ............................. 264/446; 264/447
(58) Field of Search ..................... 264/446, 447

(56) References Cited

U.S. PATENT DOCUMENTS

| | | |
|---|---|---|
| 4,215,188 | 7/1980 | Saathoff et al. . |
| 4,465,747 | 8/1984 | Evans . |
| 5,168,019 | 12/1992 | Sugeno . |
| 5,192,629 | 3/1993 | Guyomard et al. . |
| 5,419,985 | 5/1995 | Koksbang . |
| 5,427,875 | 6/1995 | Yamamoto et al. . |
| 5,443,929 | 8/1995 | Yamamoto et al. . |
| 5,604,057 | 2/1997 | Nazri . |
| 5,639,438 | 6/1997 | Ellgen . |
| 5,683,835 | 11/1997 | Bruce . |
| 5,700,597 | 12/1997 | Zhong et al. . |
| 5,733,685 | 3/1998 | Wang . |
| 5,783,328 | 7/1998 | Wang . |
| 5,869,207 | 2/1999 | Saidi et al. . |
| 5,871,866 | * 2/1999 | Barker et al. ..................... 429/231.1 |
| 5,951,919 | * 9/1999 | Hwang et al. ..................... 252/518.1 |
| 5,961,949 | * 10/1999 | Manev et al. ..................... 423/599 |
| 5,976,489 | * 11/1999 | Saidi et al. ..................... 423/599 |
| 6,007,947 | * 12/1999 | Mayer ..................... 429/231.1 |
| 6,017,654 | * 1/2000 | Kumta et al. ..................... 429/231.95 |

FOREIGN PATENT DOCUMENTS

| | | |
|---|---|---|
| 0 814 524 A1 | 12/1997 | (EP) . |
| 0 820 113 A1 | 1/1998 | (EP) . |
| 59-081870 | 5/1984 | (JP) . |
| 61-165961 | 7/1986 | (JP) . |
| 4-363865 | 12/1992 | (JP) . |
| 6-333598 | 12/1994 | (JP) . |
| 7-235297 | 9/1995 | (JP) . |
| 8-321326 | 12/1996 | (JP) . |
| WO 92/20112 | 11/1992 | (WO) . |
| WO 98/02930 | 1/1998 | (WO) . |
| WO 99/00329 | 1/1999 | (WO) . |
| 00/01606 | 9/2000 | (WO) . |

* cited by examiner

Primary Examiner—Daniel Jenkins
(74) Attorney, Agent, or Firm—Harness, Dickey & Pierce, P.L.C.

(57) ABSTRACT

The invention provides an electrochemically active material comprising particles of spinel lithium manganese oxide having on the surface of each particle cationic metal species bound to the spinel at anionic sites of the particle surface; where the cationic metal species includes a metal selected from the group consisting of transition metals, non-transition metals having a +3 valence state, and mixtures thereof. The active material is characterized by a reduced surface area and increased capacity expressed in milliamp hour per gram as compared to the spinel alone.

16 Claims, 6 Drawing Sheets

LITHIUM MANGANESE OXIDE-BASED ACTIVE MATERIAL

FIELD OF THE INVENTION

This invention relates to electrochemical cells and batteries, and more particularly, to improved electrode active material of such batteries, and novel methods of synthesis.

BACKGROUND OF THE INVENTION

Lithium batteries are prepared from one or more lithium electrochemical cells containing electrochemically active (electroactive) materials. Such cells typically include an anode (negative electrode), a cathode (positive electrode), and an electrolyte interposed between spaced apart positive and negative electrodes. Batteries with anodes of metallic lithium and containing metal chalcogenide cathode active material are known. The electrolyte typically comprises a salt of lithium dissolved in one or more solvents, typically nonaqueous (aprotic) organic solvents. Other electrolytes are solid electrolytes typically called polymeric matrixes that contain an ionic conductive medium, typically a metallic powder or salt, in combination with a polymer that itself may be ionically conductive which is electrically insulating. By convention, during discharge of the cell, the negative electrode of the cell is defined as the anode. Cells having a metallic lithium anode and metal chalcogenide cathode are charged in an initial condition. During discharge, lithium ions from the metallic anode pass through the liquid electrolyte to the electrochemical active (electroactive) material of the cathode whereupon they release electrical energy to and external circuit.

It has recently been suggested to replace the lithium metal anode with an intercalation anode, such as a lithium metal chalcogenide or lithium metal oxide. Carbon anodes, such as coke and graphite, are also intercalation materials. Such negative electrodes are used with lithium-containing intercalation cathodes, in order to form an electroactive couple in a cell. Such cells, in an initial condition, are not charged. In order to be used to deliver electrochemical energy, such cells must be charged in order to transfer lithium to the anode from the lithium-containing cathode. During discharge the lithium is transferred from the anode back to the cathode. During a subsequent recharge, the lithium is transferred back to the anode where it reintercalates. Upon subsequent charge and discharge, the lithium ions ($Li^+$) are transported between the electrodes. Such rechargeable batteries, having no free metallic species are called rechargeable ion batteries or rocking chair batteries. See U.S. Pat. Nos. 5,418,090; 4,464,447; 4,194,062; and 5,130,211.

Preferred positive electrode active materials include $LiCoO_2$, $LiMn_2O_4$, and $LiNiO_2$. The cobalt compounds are relatively expensive and the nickel compounds are difficult to synthesize. A relatively economical positive electrode is $LiMn_2O_4$, for which methods of synthesis are known, and involve reacting generally stoichiometric quantities of a lithium-containing compound and a manganese containing compound. The lithium cobalt oxide ($LiCoO_2$), the lithium manganese oxide ($LiMn_2O_4$), and the lithium nickel oxide ($LiNiO_2$) all have a common disadvantage in that the charge capacity of a cell comprising such cathodes suffers a significant loss in capacity. That is, the initial capacity available (amp hours/gram) from $LiMn_2O_4$, $LiNiO_2$, and $LiCoO_2$ is less than the theoretical capacity because less than 1 atomic unit of lithium engages in the electrochemical reaction. Such an initial capacity value is significantly diminished during the first cycle operation and such capacity further diminishes on every successive cycle of operation. The specific capacity for $LiMn_2O_4$ is at best 148 milliamp hours per gram. As described by those skilled in the field, the best that one might hope for is a reversible capacity of the order of 110 to 120 milliamp hours per gram. Obviously, there is a tremendous difference between the theoretical capacity (assuming all lithium is extracted from $LiMn_2O_4$) and the actual capacity when only 0.8 atomic units of lithium are extracted as observed during operation of a cell. For $LiNiO_2$ and $LiCoO_2$ only about 0.5 atomic units of lithium is reversibly cycled during cell operation. Many attempts have been made to reduce capacity fading, for example, as described in U.S. Pat. No. 4,828,834 by Nagaura et al. However, the presently known and commonly used, alkali transition metal oxide compounds suffer from relatively low capacity. Therefore, there remains the difficulty of obtaining a lithium-containing chalcogenide electrode material having acceptable capacity without disadvantage of significant capacity loss when used in a cell.

Capacity fading is well known and is calculated according to the equation given below. The equation is used to calculate the first cycle capacity loss. This same equation is also used to calculate subsequent progressive capacity loss during subsequent cycling relative back to the first cycle capacity charge reference.

$$\frac{((\text{FC charge capacity}) - (\text{FC discharge capacity})) \times 100\%}{\text{FC charge capacity}}$$

In U.S. Pat. No. 4,828,834 Nagaura et al. attempted to reduce capacity fading by sintering precursor lithium salt and $MnO_2$ materials and thereby forming an $LiMn_2O_4$ intercalation compound. However, Nagaura's $LiMn_2O_4$ compounds were not fully crystallized spinel electrodes and suffered from a very low capacity. Despite the above approaches, there remains the difficulty of obtaining lithium manganese oxide based electrode materials having the attractive capacity of the basic spinel $Li_xMn_2O_4$ intercalation compound, but without its disadvantage of significant capacity loss on progressive cycling.

SUMMARY OF THE INVENTION

The present invention provides a composition suitable for use as an electrochemically active material for an electrochemical cell. The composition comprises particles of spinel lithium manganese oxide having on the surface of the particles ionic metal species bound to the spinel at oppositely charged respective ionic sites of the spinel particle surface. The ionic metal species preferably includes a transition metal. Alternatively, the ionic metal species includes a non-transition metal capable of a +3 valence state. The ionic species may contain mixtures of the foregoing metals. Cationic metal species bound to the spinel particle surface include, but are not limited to, metal cation, metal oxide cation, and metal phosphate cation.

In a preferred method, the composition comprising the spinel lithium manganese oxide having ionic species bound thereto is prepared by decomposing or melting a precursor metal compound on the surface of the spinel particles, thereby giving rise to the cationic metal species.

The spinel lithium manganese oxide treated for improved results by the method of the invention is known to have the nominal formula $Li_1Mn_2O_4$. Such spinel lithium manganese oxide compounds may vary in the relative proportion of lithium, manganese, and oxygen while maintaining identity as a spinel lithium manganese oxide insertion compound.

The invention is not limited to any particular formulation for a spinel lithium manganese oxide. However, advantageous results are obtained when the spinel lithium manganese oxide is represented by the nominal formula $Li_{1+x}Mn_{2-x}O_4$ where x is a range of about −0.2 to about +0.5; and more preferably where x is greater than zero and up to about 0.5.

The treated spinel lithium manganese oxide is prepared as an electrode by mixing it with a binder and optionally with an electrically conductive material and forming it into an electrical structure.

The composite spinel manganese oxide particles having the metal species bound thereto is prepared by first forming a mixture comprising the lithium manganese oxide particles and the metal compound. The mixture may be formed by mixing lithium manganese oxide powder and metal compound powder. Alternately, the metal compound (metal salt) is dissolved in a suitable solvent, then the lithium manganese oxide particles are thoroughly wetted by the solution before reaction. Reaction is conducted by heating the mixture containing the spinel particles and the metal compound for a time and at a temperature sufficient to form a decomposition product of the metal compound on the surface of the particles. In an alternative embodiment, the metal compound is reacted at the surface of the spinel while undergoing limited, very little, or no decomposition. For example, when the metal compound is a phosphate salt, the phosphate salts retain their phosphate groups, and the heating serves to chemically disperse and adhere the phosphate to the spinel.

It is preferred that the heating to cause reaction between the metal compound and the surface of the lithium manganese oxide be conducted at a temperature in a range from about 200° C. to about 800° C., desirably 200° C. to about 750° C., more desirably 200° C. to about 700° C., in an air atmosphere for at least about ½ hour and up to about 6 hours. Since any amount of the metal compound will improve the characteristics of the LMO, there is no practical lower limit to the amount to be added as long as the amount is greater than zero. It is preferred that the amount of metal compound included with the lithium manganese oxide in the mixture be up to about 10 wt. % of the mixture with the lithium manganese oxide constituting the balance.

Objects, features, and advantages of the invention include an improved electrochemical cell or battery based on lithium which has improved charging and discharging characteristics, a large discharge capacity, and which maintains its integrity during cycling. Another object is to provide a cathode active material which combines the advantages of large discharge capacity and with relatively lesser capacity fading. It is also an object of the present invention to provide positive electrodes having active materials which operate with good performance over a relatively broad temperature range. Another object is to provide a method for forming cathode active material which lends itself to commercial scale production providing for ease of preparing large quantities.

These and other objects, features, and advantages will become apparent from the following description of the preferred embodiments, claims, and accompanying drawings.

DETAILED DESCRIPTION OF THE PREFERRED EMBODIMENTS

The treated lithium manganese oxide of this invention is obtained essentially as a result of the thermal dispersion of a metal compound onto the surface of the lithium manganese oxide and preferably concurrently the decomposition of said metal compound on the surface. This is accomplished by heating the dispersed metal compound at an elevated temperature after the metal compound and the LMO have been brought into contact with each other. It is believed that the treated lithium manganese oxide (LMO) made in accordance with this invention differs fundamentally from the lithium manganese oxide known in the art. This difference is reflected in the treated lithium manganese oxide distinguished electrical chemical performance in a cell and also distinguished by the process by which the treated LMO is prepared.

Many metal compounds or their mixtures can be used, and metal salts are preferred. One group of desirable metal compounds are transition metal compounds. Another group of desirable metal compounds are non-transition metal compounds which contain a metal capable of a +3 valence state, such as aluminum. Some representative examples of the metal compounds which can be suitably utilized in the practice of this invention include, for example, $LiAlCl_4$ (lithium aluminum chloride), nitrates, including $Al(NO_3)_3$ (aluminum nitrate), $Cr_2(OCOCH_3)_4$ (chromium acetate), $NiCO_3$ (nickel carbonate), $Co(NO_3)_2$ (cobalt nitrate), $CoCO_3$ (cobalt carbonate), and $ZrOCl_2$ (zirconium aluminum chloride). Mixtures of these and similar compounds may also be used.

An example is the mixture: $LiNO_3$ $Co(NO_3)_2$, $Al(NO_3)_3$, $NiCO_3$. Other examples can be found in Table 1.

Desirable metal compounds are transition metals with nitrates, acetates, carbonates, and phosphates; and especially preferred are the nitrates; with cobalt nitrate being most preferred. As the lithium manganese oxide (LMO) used to produce the treated LMO of this invention, a range of formulations may be used consistent with the basic lithium manganese oxide spinel of the nominal general formula $LiMn_2O_4$.

The nominal general formula $LiMn_2O_4$ represents a relatively narrow range of spinel lithium manganese oxide compounds (referred to as LMO) which have a stoichiometry that varies somewhat in the relative proportion of lithium, manganese and oxygen, but still having the spinel structure. Oxygen deficient spinels are not favored here. Relatively lithium rich spinels are favored here. One desirable range of compositions is the spinel formula $Li_{1+x}Mn_{2-x}O_4$ where $0<x\leq0.5$. Lithium deficient spinels with x less than O (i.e., −0.2) are also known. In the experiments below, a spinel lithium manganese oxide had a surface area of 0.9 $m^2/g$; average particle size of 30 microns; lithium content of 4.1%, corresponding to $Li_{1.07}$; less than 1% impurities and lattice parameter of 8.22.

Such lithium manganese oxide compounds must have a suitably high surface area and the ability to be coated with metal compound which is dispersed and decomposed thereon. It is desirable in the preparation of the treated LMO according to the invention, that the surface area of the LMO is between about 0.5 and 2.5 $m^2/g$ and that the range of composition would be lithium content of $1.02\leq x\leq1.10$.

In the process for the preparation of the treated LMO according to the invention, a mixture containing the metal compound and the LMO is used. In a preferred embodiment of the invention, the mixture is prepared simply by mixing mechanically a powder form of the metal compound and a powder form of the LMO. The mixture can also be obtained by adding to the LMO a solution or suspension of the metal compound in a suitable solvent. Thereafter, the solvent is removed from the resulting mixture by heating, vacuum, simple evaporation, or other equivalent means known in the art.

Representative examples of solvents that can be suitably used include, acetone and primary or secondary alcohols having one to seven carbon atoms. One particularly suitable solvent is methanol.

In the above-described mixture containing the metal compound and the LMO, the amount of metal compound is desirably from 0.1 to 10%, more desirably from 0.5 to 5%, and preferably 1 to 4% by weight of the mixture, with the LMO constituting the balance.

The prepared mixture containing the metal compound and the LMO is subjected to heating. This heating step is carried out at a temperature high enough to initiate the thermal dispersion of the metal compound onto the surface of individual particles of the LMO. The temperature is also desirably high enough to at least partially decompose the metal compound at the surface. Preferably, the temperature is high enough to essentially completely decompose the metal compound, leaving behind the positive cation of the metal which formerly constituted the metal compound. The extent of decomposition depends upon the metal compound used and the desired result. Metal phosphate compounds do not significantly decompose, but do appear to be bound at the spinel surface, and form a reacted product with the spinel at the surface. In the case where a mixed metal compound is used, cations from different metal elements may remain after decomposition. However, the heating temperature is below the temperature at which the LMO will be decomposed, and the heating temperature is below the melting point of the LMO. Heating is conducted for a duration of time sufficient to thermally disperse the metal compound onto the surface of the LMO, and as stated above, is preferably sufficient to at least partially decompose it. It is considered that complete decomposition is achieved when the only residual from the metal compound remaining on the surface is a metal cation which originated from the compound. The exceptional case being as per the phosphate example.

In the practice of the invention, the heating step is conveniently performed at a temperature in the range of about 200° C. to about 850° C. for a period of time from about 0.5 to about 12 hours. Desirably the heating is conducted at about 200° C. to about 800° C., more desirably 200° C. to about 750° C., and most desirably at about 200° C. to about 700° C. In one embodiment, the heating is conducted at a temperature in the range of about 400 to about 500° C. and for a time of about 4 to 6 hours. The conditions depend, in part, on the metal compound used.

The heating step can be conveniently conducted in a suitable atmosphere such as ambient air. Advantageously, special conditions such as vacuum, inert or oxygen content control are not needed.

The heating should be carried out for a time period sufficient to cause a surface-area-reducing effect on the LMO. It is believed that the greater the amount of the residual metal ion remaining after dispersion and decomposition, the greater will be the surface area reduction effect.

Positive electrode active materials were prepared and tested to determine physical, chemical and electrochemical features. The results are reported in FIGS. 1 to 10. Typical cell configurations will be described with reference to FIGS. 11 and 12.

Figure 11:
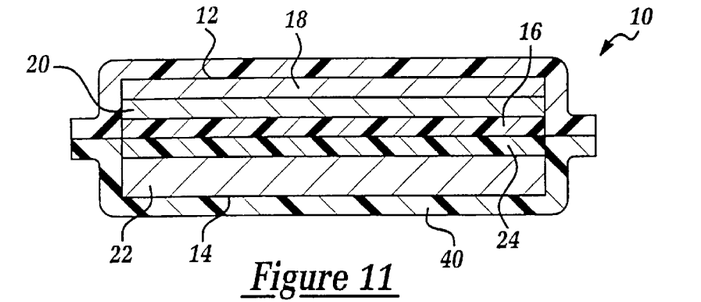
FIG. 11 is a diagrammic representation of a typical laminated lithium-ion battery cell structure.

A typical laminated battery cell structure 10 is depicted in FIG. 11. It comprises a negative electrode side 12, a positive electrode side 14, and an electrolyte/separator 16 therebetween. Negative electrode side 12 includes current collector 18, and positive electrode side 14 includes current collector 22. A copper collector foil 18, preferably in the form of an open mesh grid, upon which is laid a negative electrode membrane 20 comprising an intercalation material such as carbon or graphite or low-voltage lithium insertion compound, dispersed in a polymeric binder matrix. An electrolyte separator film 16 membrane of plasticized copolymer is positioned upon the electrode element and is covered with a positive electrode membrane 24 comprising a composition of a finely divided lithium intercalation compound in a polymeric binder matrix. An aluminum collector foil or grid 22 completes the assembly. Protective bagging material 40 covers the cell and prevents infiltration of air and moisture.

Figure 12:
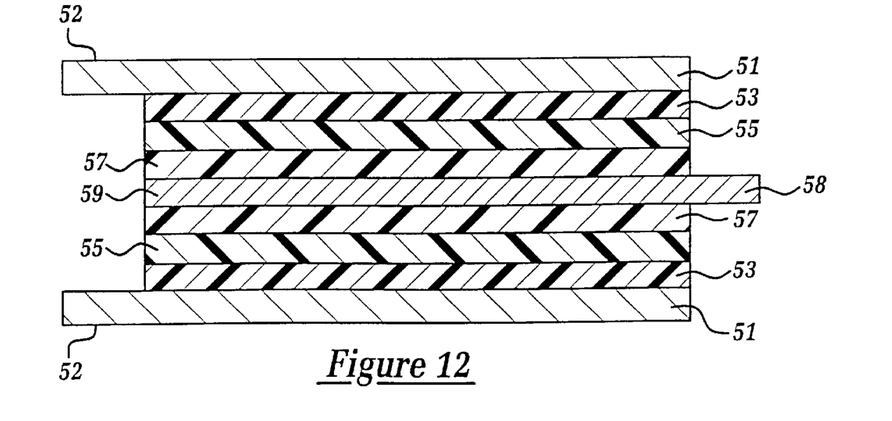
FIG. 12 is a diagrammic representation of a typical multicell battery cell structure.

In another embodiment, a multicell battery configuration as per FIG. 12 is prepared with copper current collector 51, negative electrode 53, electrolyte/separator 55, positive electrode 57, and aluminum current collector 59. Tabs 52 and 58 of the current collector elements form respective terminals for the battery structure.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–95 weight percent. The negative electrode comprises about 50–95% by weight of a preferred graphite, with the balance constituted by the binder. A typical electrolyte separator film comprises approximately two parts polymer for every one part of a preferred fumed silica. Before removal of the plasticizer, the separator film comprises about 20–70% by weight of the composition; the balance constituted by the polymer and fumed silica in the aforesaid relative weight proportion. The conductive solvent comprises any number of suitable solvents and salts. Desirable solvents and salts are described in U.S. Pat. Nos. 5,643,695 and 5,418,091. One example is a mixture of EC:DMC:LiPF$_6$ in a weight ratio of about 60:30:10.

Solvents are selected to be used individually or in mixtures, and include dimethyl carbonate (DMC), diethylcarbonate (DEC), dipropylcarbonate (DPC), ethylmethylcarbanate (EMC), ethylene carbonate (EC), propylene carbonate (PC), butylene carbonate, lactones, esters, glymes, sulfoxides, sulfolanes, etc. The preferred solvents are EC/DMC, EC/DEC, EC/DPC and EC/EMC. The salt content ranges from 5% to 65% by weight, preferably from 8% to 35% by weight.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

In the construction of a lithium-ion battery, a current collector layer of aluminum foil or grid is overlaid with a positive electrode film, or membrane, separately prepared as a coated layer of a dispersion of intercalation electrode composition. This is typically an intercalation compound such as LiMn$_2$O$_4$ (LMO), LiCoO$_2$, or LiNiO$_2$, powder in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Examples of forming cells containing metallic lithium anode, intercalation electrodes, solid electrolytes and liquid electrolytes can be found in U.S. Pat. Nos. 4,668,595; 4,830,939; 4,935,317; 4,990,413; 4,792,504; 5,037,712; 5,262,253; 5,300,373; 5,435,054; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VDF:HFP polymeric matrix. Examples of casting, lamination and formation of cells using VdF:HFP are as described in U.S. Pat. Nos. 5,418,091; 5,460,904; 5,456,000; and 5,540,741; assigned to Bell Communications Research, each of which is incorporated herein by reference in its entirety.

As described earlier, the electrochemical cell which utilizes the novel solvent of the invention may be prepared in a variety of ways. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, test cells were fabricated using lithium metal electrodes. When forming cells for use as batteries, it is preferred to use an intercalation metal oxide positive electrode and a graphitic carbon negative electrode. Various methods for fabricating electrochemical cells and batteries and for forming electrode components are described herein. The invention is not, however, limited by any particular fabrication method as the novelty lies in the treated LMO active material.

EXAMPLE 1

Preparation Using 96:4 By Weight LMO:LiAlCl$_4$

In this example, treated lithium manganese oxide was prepared using a lithium aluminum chloride compound. The lithium manganese oxide in this example had the nominal formula $Li_{1.08}Mn_{1.92}O_4$ and was obtained from Japan Energy Corporation. The lithium aluminum chloride had the formula LiAlCl$_4$ It was obtained from Aldrich Chemical Company. The lithium aluminum chloride is known to be hygroscopic. This required that the grinding of the lithium aluminum chloride powder to the desired particle size be done under argon. The milled lithium aluminum chloride and the lithium manganese oxide powders were mixed and milled together to achieve a well intermingled mixture. The objective is to achieve an intermingled mixture which is as close to homogeneous as possible. In this example, the mixture constituted 4% by wt. of the lithium aluminum tetrachloride and 96% by wt. of the lithium manganese oxide. The intermingled particles were then heated in a furnace at a temperature of about 450° C. for a time of about 1 hour. The heating was conducted in air, and no special atmosphere was required. Heating at this temperature and time was found to be sufficient to decompose the lithium aluminum chloride compound. After heating for 1 hour, the product was allowed to cool. The rate of cooling did not appear to be critical and it was possible to simply remove the product from the oven and let it cool down to room temperature. It is also possible to allow it to cool in the oven once the heat has been turned off. Quenching by cooling at room temperature is convenient but does not appear to be critical.

The active material, the treated lithium manganese oxide of the invention, prepared according to this example, was tested in a test cell. Positive electrode, as tested, comprised the active material at 87% by wt.; carbon black (Super-P type) 4% by wt.; and 9% by wt. polyvinylidene-flouride-co-hexafluoropropane type binder. The electrolyte was a 2 to 1 weight ratio of EC and DMC solvents and contained 1 molar LiPF$_6$ type salt. The separator was a glass fiber type. The counter electrode was metallic lithium. The current density of the test cell was 0.08 milliamp hours per cm$^2$. The test cell was based on 2.4 cm$^2$ positive electrode with active material loading of about 34 to 36 milligrams per cm$^2$. The capacity was determined under constant current cycling ±0.08 mA/cm$^2$ at room temperature. The cell was cycled between about 3 and about 4.3 volts with performance as shown in the Figures.

Figure 1:
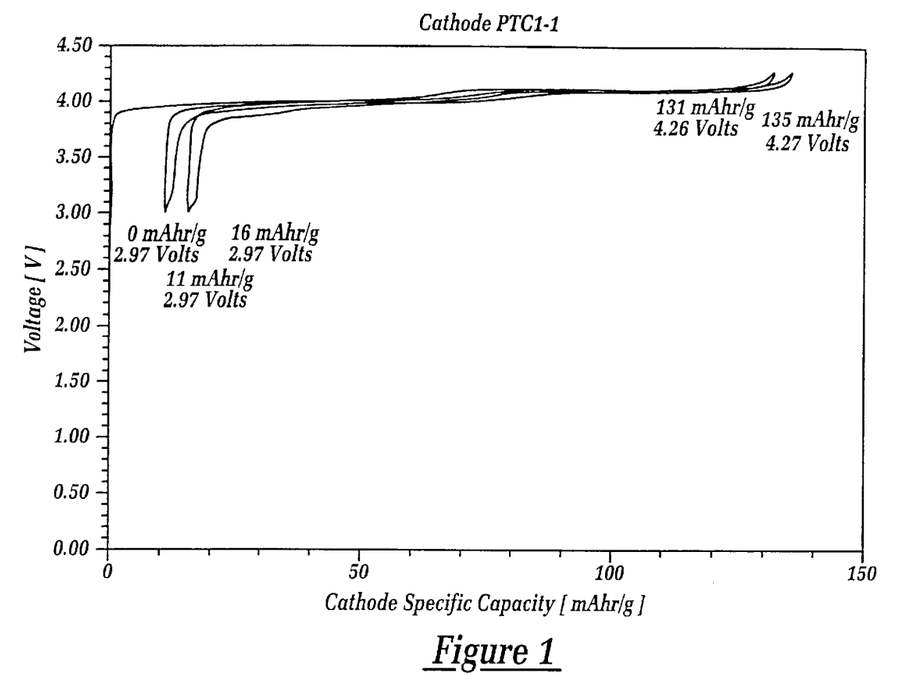
FIG. 1 is an EVS (electrochemical voltage spectroscopy) voltage/capacity profile for a cell embodying the specially treated lithium manganese oxide (LMO) material of the invention in combination with a lithium metal counter electrode in an electrolyte comprising a mixture of ethylene carbonate and dimethyl carbonate and including a one molar concentration of $LiPF_6$ salt. The lithium manganese oxide based electrode and the lithium metal counter electrode are maintained spaced apart by a separator of glass fiber which is interpenetrated by the solvent and the salt. The conditions of cycling are ±10 mV, between about 3.0 and 4.4 volts, and the critical current density is less than or equal to about 0.08 $mA/cm^2$. The treated LMO was prepared using lithium aluminum chloride in a weight proportion of 4% $LiAlCl_4$ and 96% LMO.

FIG. 1 shows a voltage profile of the test cell, based on the treated lithium manganese oxide (LMO) positive electrode active material of the invention, and using a lithium metal counter electrode as described in the examples. The data shown in FIG. 1 is based on the Electrochemical Voltage Spectroscopy (EVS) technique. Electrochemical and kinetic data were recorded using the Electrochemical Voltage Spectroscopy (EVS) technique. Such technique is known in the art as described by J. Barker in Synth, Met 28, D217 (1989); Synth. Met. 32, 43 (1989); J. Power Sources, 52, 185 (1994); and Electrochemical Acta, Vol. 40, No. 11, at 1603 (1995).

FIG. 1 clearly shows and highlights the very good performance and reversibility of the treated lithium manganese oxide of the invention. The positive electrode contained about 85 milligrams of the treated active material. The total electrode weight including the binder and conductive carbon diluent was about 98 milligrams. The positive electrodes showed a performance of about 131 milliamp hours per gram on the first discharge. This means that the electrode provided a specific capacity of 131 milliamp hours per gram out (lithium extracted). Then on recharge of this active material, on the order of 123 milliamp hours per gram was observed in (lithium inserted). On subsequent cycling, good performance continued to be exhibited. In a re-test of this sample, the positive electrode provided 130 mAh/gm on first discharge (lithium extracted) and 122 mAh/gm on the second cycle discharge.

Figure 2:
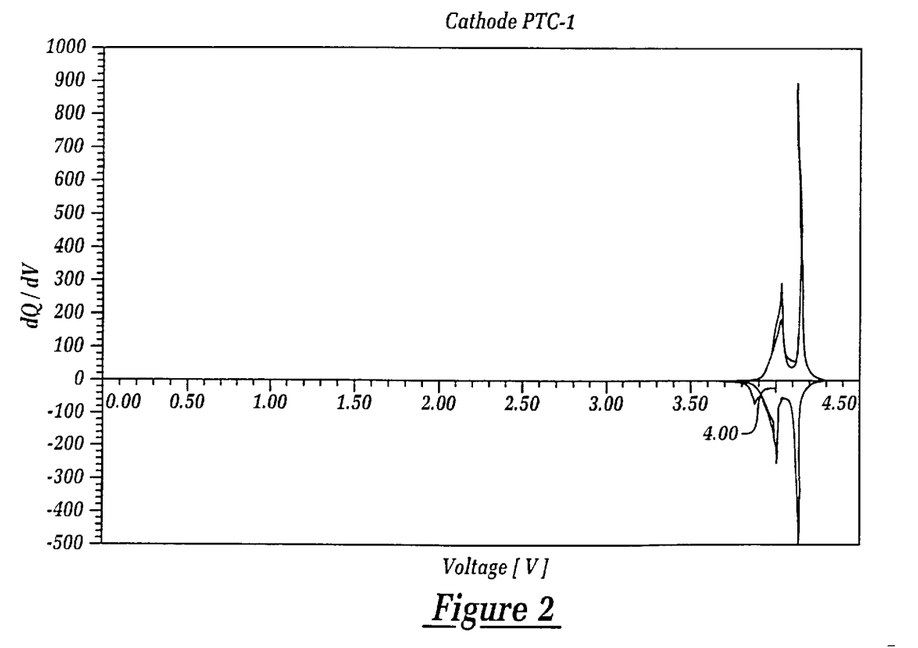
FIG. 2 is an EVS differential capacity plot for the cell as described in connection with FIG. 1.

FIG. 2 is an EVS differential capacity plot based on FIG. 1. As can be seen from FIG. 2, the relatively symmetrical nature of the peaks indicates good electrical reversibility, there being no peaks related to irreversible reactions, since all peaks above the axis (cell charge) have corresponding peaks below the axis (cell discharge), and there is essentially no separation between the peaks above and below the axis. The peaks also show an indication of good crystallinity from their sharp appearance demonstrating a good crystallinity of the active material.

Figure 3:
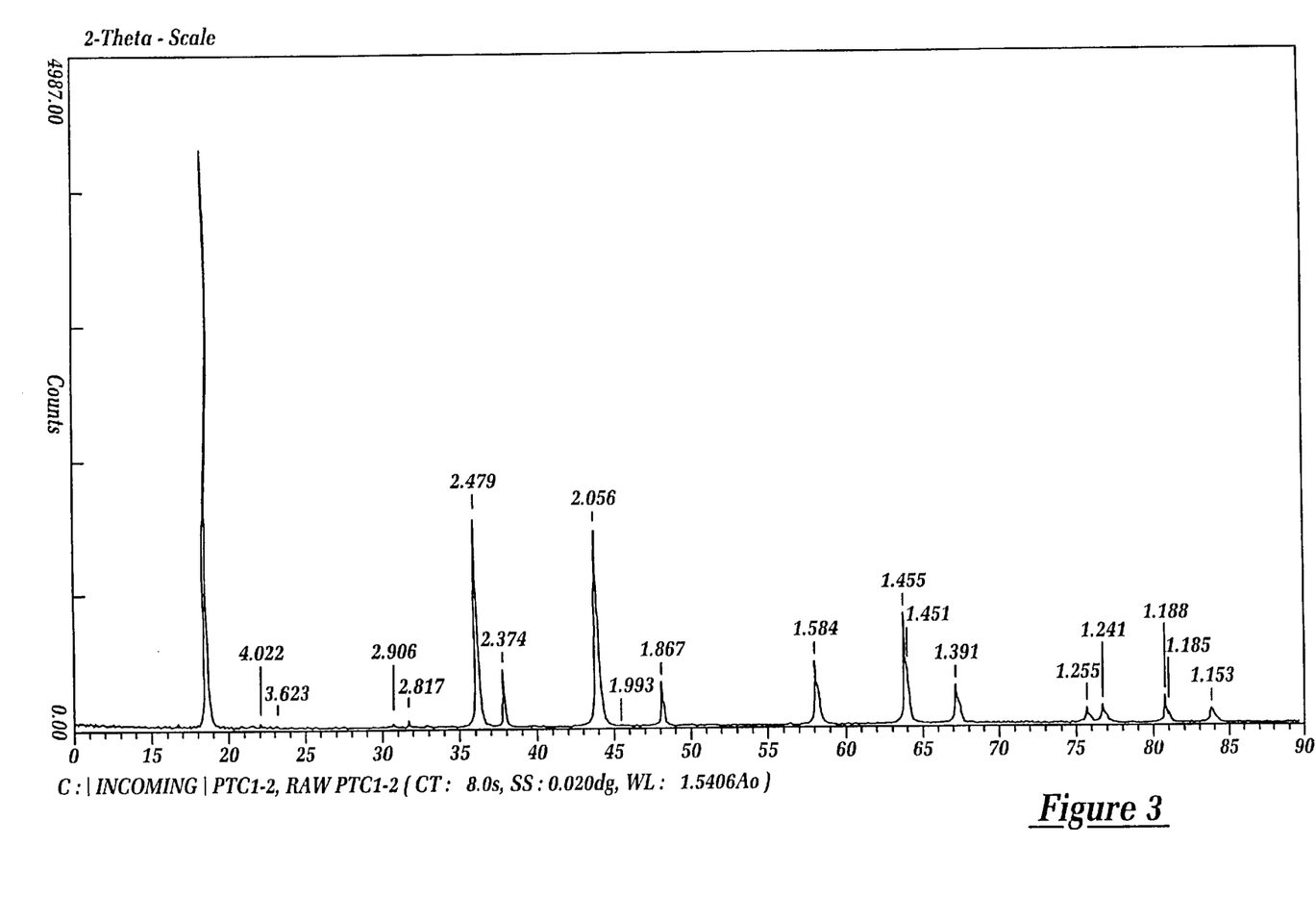
FIG. 3 shows the results of an x-ray diffraction analysis of the specially treated lithium manganese oxide prepared according to the invention, using CuKα with λ=1.5418 angstroms.
Figure 4:
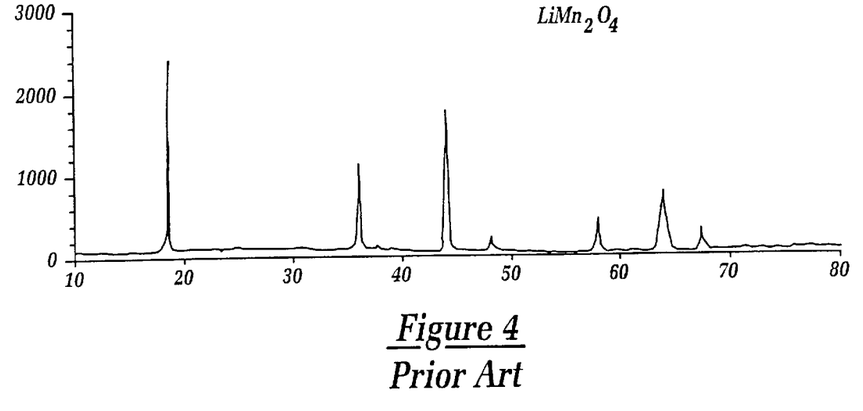
FIG. 4 contains an x-ray diffraction analysis of conventional, untreated LMO, as received from a vendor.
Figure 5:
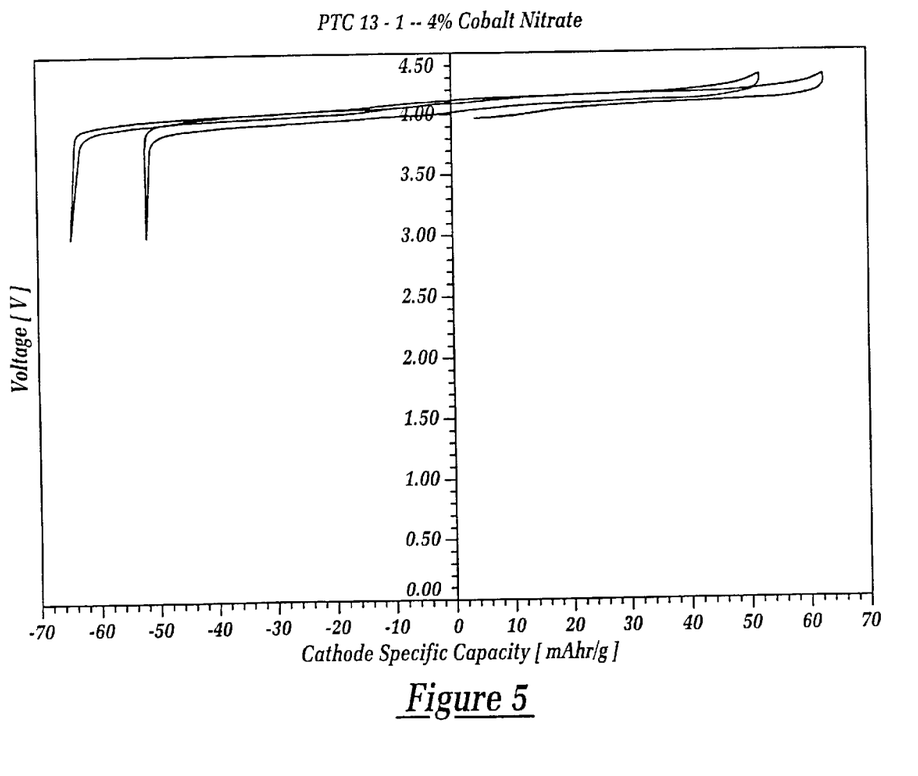
FIG. 5 is an EVS voltage/capacity profile for a cell containing lithium manganese oxide material treated with cobalt nitrate to provide the active material for a positive electrode of the invention in combination with a lithium metal counter-electrode in an electrolyte as described with respect to FIG. 1 above. The conditions of the test are as described with respect to FIG. 1 above. The treated LMO was prepared using a weight proportion of 4% cobalt nitrate and 96% LMO.
Figure 6:
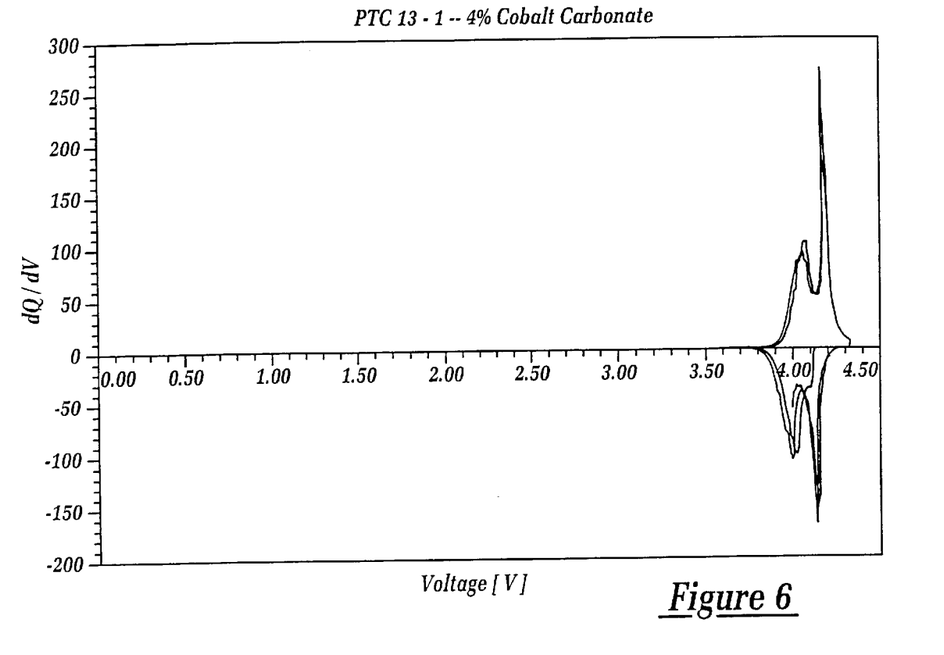
FIG. 6 is an EVS differential capacity plot for the cell as described in connection with FIG. 5.
Figure 7:
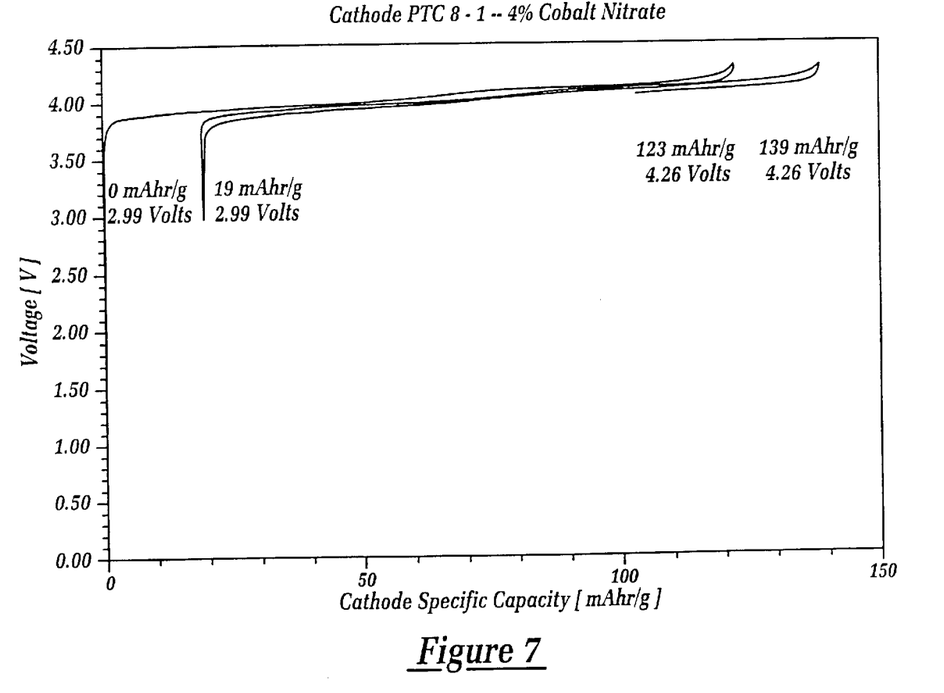
FIG. 7 is an EVS voltage/capacity profile for a cell containing lithium manganese oxide material treated with cobalt nitrate to provide the active material for a positive electrode of the invention in combination with a lithium metal counter-electrode in an electrolyte as described with respect to FIG. 1 above. The conditions of the test are as described with respect to FIG. 1 above. The treated LMO was prepared using a weight proportion of 5.3% cobalt nitrate and 96% LMO.
Figure 8:
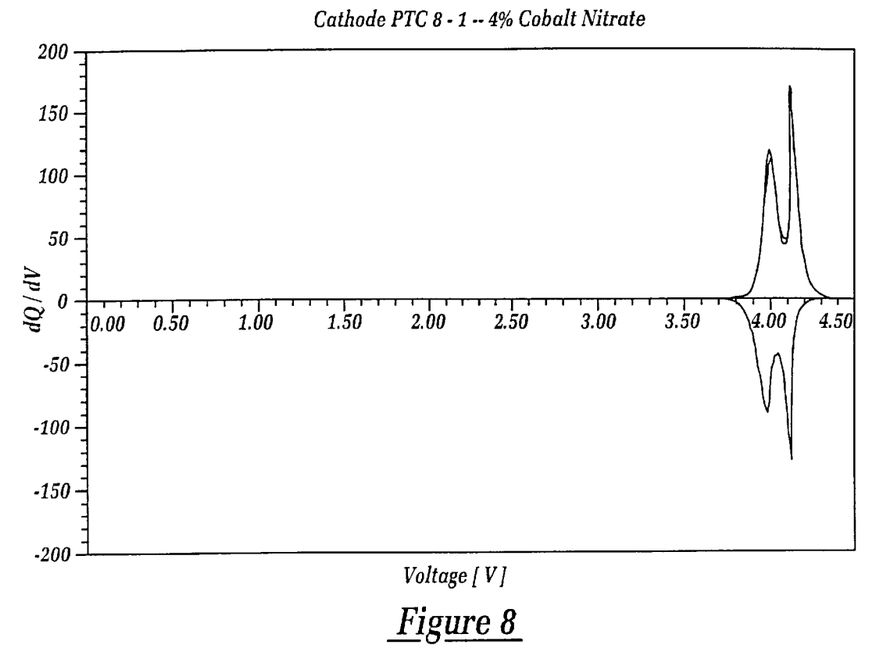
FIG. 8 is an EVS differential capacity plot for the cell as described in connection with FIG. 7.
Figure 9:
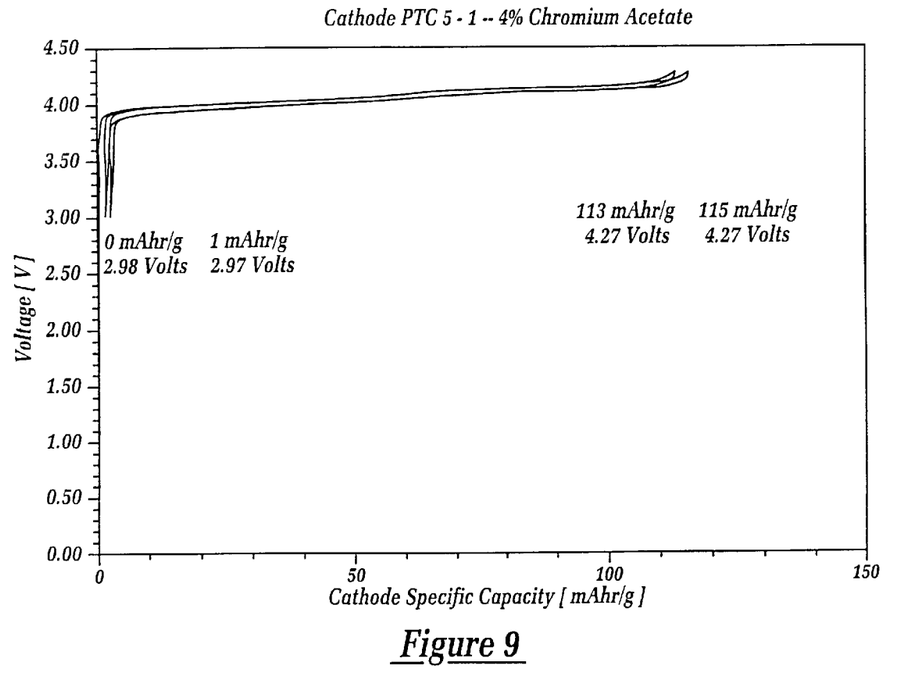
FIG. 9 is an EVS voltage/capacity profile for a cell containing lithium manganese oxide material treated with chromium acetate to provide the active material for a positive electrode of the invention in combination with a lithium metal counter-electrode in an electrolyte as described with respect to FIG. 1 above. The conditions of the test are as described with respect to FIG. 1 above. The treated LMO was prepared using a weight proportion of 4% chromium acetate and 96%. LMO.
Figure 10:
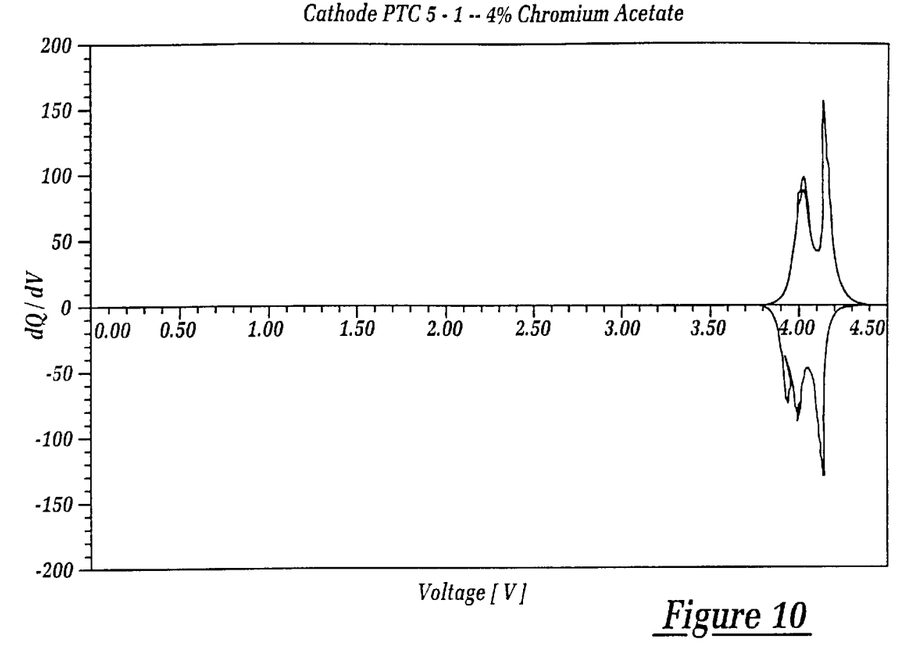
FIG. 10 is an EVS differential capacity plot for the cell as described in connection with FIG. 9.

FIG. 3 shows the results of an x-ray diffraction analysis of the treated lithium manganese oxide prepared according to the invention. The x-ray diffraction was conducted using CuKα type radiation. The diffraction analysis shown in FIG. 3 is nearly identical to conventional lithium manganese oxide (FIG. 4) of the nominal formula $Li_1Mn_2O_4$ except for the presence of the added metal compound and some variations in the amount of lithium. This minor variation in the amount of lithium is within the variation expected when conventional lithium manganese oxide is prepared. This indicates that the structure of the treated LMO of the invention is similar, and essentially identical to, the basic spinel structure of conventional $Li_1Mn_2O_4$. This is advantageous because the spinel structure is known to reversibly intercalate lithium at a higher rate compared to other structures such as tetragonal lithium manganese oxide. FIG. 4 contains an x-ray diffraction analysis of conventional lithium manganese oxide ($Li_1Mn_2O_4$) prepared according to conventional techniques and as received from the vendor. See U.S. Pat. No. 5,770,018, incorporated by reference herein in its entirety, for a description of conventional LMO. As can be seen by comparing FIGS. 3 and 4, the product of the invention has the same spinel structure as the conventional lithium manganese oxide, except that the product of the invention has the metal added to its surface. The a-axis parameter of the spinel product of the invention is 8.2330. This further demonstrates its similarity to conventional lithium manganese oxide having a similar a-axis parameter. Since this is a cubic structure, the other axes correspond and are all 90 degrees with respect to one another. These features are the same as conventional lithium manganese oxide.

Further referring to FIG. 3 and Table 2, additional information is provided showing that the amount of lithium corresponds to 0.999 atomic unit with the peak at 18.668 and a full width at half max (FWHM) of about 0.1007. The amount of lithium present in the treated compound proportionately would be expected to change in accordance with the atomic amount of other metal, here aluminum, deposited on the surface.

EXAMPLE 2

97:3 LMO:LiAlCl$_4$

The procedure of Example 1 was followed except that the weight percent of the lithium manganese oxide and the lithium aluminum chloride were changed. In this example, 3% by wt. lithium aluminum tetrachloride was used and 97 wt. % lithium manganese oxide was used. As shown in Table 2, this example provided a slightly increased amount of lithium, but the cell parameters and peaks essentially remained unchanged. Here cycling performance was also good.

EXAMPLE 3

98:2 LMO:LiAlCl$_4$

The method of Example 1 was followed except that 2 wt. % lithium aluminum tetrachloride was combined with 98% lithium manganese oxide which was then heat treated in the manner as described with respect to Example 1. With reference to Table 2, it can be seen that the atomic amount of lithium present in this product was slightly increased compared to the prior examples since a lesser amount of the metal compound was used.

EXAMPLE 4

99:1 LMO:LiAlCl4

In this example, 1% by wt. lithium aluminum tetrachloride was combined with 99% by wt. lithium manganese oxide. The trends as described with respect to earlier examples continued to be followed demonstrating that the spinel structure was maintained.

Still additional formulations of lithium aluminum tetrachloride and lithium manganese oxide were prepared as shown in Table 2 and designated as Examples PTC1-2, PTC1-14, and PTC1-15 having respectively 4, 2, and 10 wt. % lithium aluminum tetrachloride. As per the lattice parameters for all the foregoing examples, the spinel structure was preserved. Based upon the cycling performance of the 10% by wt. metal compound additive case, it did not appear that this significant amount of additive is required in order to improve performance.

EXAMPLE 5

98:2 LMO:Co$_3$(PO$_4$)$_2$

The method of Example 1 was followed except that the metal compound was cobalt phosphate. In this example, 2% by wt. cobalt phosphate was combined with the aforesaid conventional lithium manganese oxide obtained from the vendor. Heating was conducted at a temperature of about 200° C. for about 2 hours time. Good cycling performance was demonstrated. As can be seen by reference to Table 2, the spinel structure was also maintained when the metal compound used was cobalt phosphate.

EXAMPLE 6

Al(NO$_3$)$_3$; 4 Wt. % and 2.36 Wt. %

The method of Example 1 was followed except that the metal compound added to the lithium manganese oxide was aluminum nitrate. In this example, two formulations were prepared. One formulation contained 4% by wt. aluminum nitrate and 96% by wt. lithium manganese oxide. The other formulation contained 2.35% by wt. aluminum and the balance lithium manganese oxide. The two powders were heated together as per the same method as described with respect to Example 1, and heating was conducted at a temperature of 450° C. for about 2 hours. Reasonably good cycling performance was demonstrated and the spinel structure was maintained. Another batch at 4% was made and the surface area was 2.1 (again very high). It seems likely that Al having a 3+ valence makes additional oxide; compared to the transition metals with 2+ as the preferred valence.

EXAMPLE 7

Cr$_2$(OCOCH$_3$)$_4$; 3.08 Wt. % and 2.04 Wt. %

The method of Example 1 was followed except the metal compound used was chromium acetate. Two formulations were prepared. One contained 3.08 wt. % chromium acetate, the balance lithium manganese oxide; and the other contained 2.04 wt. % chromium acetate with the balance lithium manganese oxide. Each formulation was heated to about 450° C. for about 4 hours time to disperse the chromium compound on the particles of the lithium manganese oxide and to achieve decomposition of the chromium acetate thereon. As can be seen from Table 2, the surface area was considerably reduced. Cell performance was reasonably good. (See FIGS. 9 and 10).

EXAMPLE 8

NiCO3; 3.06 Wt. % and 2.04 Wt. %

The method of Example 1 was followed except the metal compound used was nickel carbonate. Two formulations were prepared. One contained 3.06 wt. % nickel carbonate, the balance lithium manganese oxide; and the other contained 2.04 wt. % nickel carbonate with the balance lithium manganese oxide. Each formulation was heated treated to disperse the nickel compound on the particles of the lithium manganese oxide and to achieve decomposition of the nickel carbonate thereon. As can be seen from Table 2, cell performance was reasonably good.

EXAMPLE 9

Co(NO$_3$)$_2$; 5.30, 4.00, 10, and 3.00 Wt. %

The method of Example 1 was followed except the metal compound used was cobalt nitrate. Four formulations were prepared, respectively containing 5.30, 4.00, 10, and 3.00 wt % cobalt nitrate, and the balance lithium manganese oxide, respectively. Each formulation was heated treated to disperse the cobalt compound on the particles of the lithium manganese oxide and to achieve decomposition of the cobalt nitrate thereon. As can be seen from Table 2, cell performance ranged from good to very high capacity. One test revealed positive electrode performance of 137 mAh/g on first discharge (lithium out) and on subsequent cycling good performance was also observed. X-ray data for the 3 wt. % cobalt carbonate/97 wt. % LMO treated sample revealed 8.2144 angstrom lattice parameter consistent with the conventional spinel. (See FIGS. 5–8).

EXAMPLE 10

In this example, the method of Example 1 was followed except that heating was conducted at different temperatures using a rotary oven (tube furnace), and the constituents heated were as stated in Table 3. The spinel, before treatment, was Li$_{1.08}$Mn$_2$O$_4$ with a surface area of 0.91 m$^2$/g. This spinel was treated with varying amounts of metal compounds under the conditions given in Table 3. In all cases, the surface area was reduced; the capacity was very good and maintained on the 2nd cycle; oxygen depletion was minimized; and the lithium content was maintained within an acceptable range. These results are impressive given that the heating temperature was 650° C. to 775° C., and such elevated temperatures are often associated with oxygen depletion.

TABLE 1

| | |
|---|---|
| LiAlCl$_4$ | lithium aluminum chloride |
| Al(NO$_3$)$_3$ | aluminum nitrate |
| NH$_4$Al(SO$_4$)$_2$ | ammonium aluminum sulfate |
| Cr$_2$(OCOCH$_3$)$_4$ | chromium acetate |

TABLE 1-continued

| | |
|---|---|
| $(NH_4)_2CrO_4$ | ammonium chromate |
| $NiCO_3$ | nickel carbonate |
| $Co(NO_3)_2$ | cobalt nitrate |
| $Cr_2O_3$ | chromium oxide |
| $LiNO_3$ & $Al(NO_3)_3$ | |
| $ZrOCl_2$ | zirconium dichloride oxide |
| $LiNO_3/Co(NO_3)_2/Al(NO_3)_3/NiCO_3$ | |
| $Cr_2(OCOCH_3)_4/Al(NO_3)_3/NiCO_3$ | |
| $COCO_3$ | cobalt carbonate |
| $Co(PO_4)_2$ | cobalt phosphate |
| $Co(NO_3)_2/NiCO_3$ | |
| $Ni_3(PO_4)_2$ | nickel phosphate |
| $Li_3PO_4$ | lithium phosphate |
| $Co(OH)_2$ | cobalt hydroxide |
| fmc 5.1 | |
| fmc 5.1/$Co(NO_3)_2$ | |
| fmc 5.1/$CuSO_4$ | |
| fmc 5.1/$Li_2CO_3$ | |

TABLE 2

| Lot # | Wt/% Additive | TGA Wt. % Loss | Xray Lattice | Li(x) | Peak | Fwhm | s.a. M2/gr | Cycle s.pH | 1st Cap | 2nd Cycle |
|---|---|---|---|---|---|---|---|---|---|---|
| LMO pristine | 0 | 0 | 8.2195 | 1.067 | 18.735 | 0.1482 | 0.9 | 8.52 | | |
| PTC1 rxn w/$LiAlCl_4$ | | | | | | | | | | |
| ptc1-1 | 4 | | 8.2330 | 0.999 | 18.668 | 0.1007 | | | 131 | 121 |
| ptc1-1 | 4 | | | | | | | | 130 | 122 |
| ptc1-3 | 3 | 0.75 | 8.2317 | 1.005 | 18.697 | 0.1024 | 0.751 | 6.22 | 126 | 119 |
| ptc1-4 | 2 | | 8.2290 | 1.019 | 18.823 | 0.1061 | 0.864 | 6.69 | 126 | 122 |
| ptc1-5 | 1 | | 8.2239 | 1.045 | 18.776 | 0.1075 | 1.023 | 7.02 | 113 | 118 |
| ptc1-2 | 4 | 0.9 | 8.2263 | 1.033 | 18.679 | 0.1010 | 0.644 | 6.86 | 122 | 119 |
| ptc1-14 | 2 | 99.47 | 8.2216 | 1.056 | | | | | 119 | 116 |
| ptc1-15 | 10 | | | | | | 0.906 | 7.22 | 109 | 103 |
| PTC15-3 rxn w/$Co_3(PO_4)_2$ | | | | | | | | | | |
| ptc15-3 | 2 | | 8.2277 | 1.025 | 18.689 | 0.1111 | 0.5997 | — | 139 | 123 |
| PTC3 rxn w/$Al(NO_3)_3$ | | | | | | | | | | |
| ptc3-1 | 4 | | 8.2178 | 1.075 | 18.679 | 0.1113 | 3.4264 | 8.92 | 107 | 105 |
| ptc3-2 | 2.36 | | | | | | | 8.38 | 112 | 113 |
| PTC4[1] rxn/ w/$Cr_2(OCOCH_3)_4$ | | | | | | | | | | |
| ptc5-1 | 3.08 | | | | | | 0.690 | 8.42 | 113 | 114 |
| ptc5-3 | 2.04 | | | | | | | | 114 | 113 |
| PTC7[2] rxn w/$NiCO_3$ | | | | | | | | | | |
| ptc7-1 | 3.06 | | | | | | | | 115 | 112 |
| ptc7-2 | 2.04 | | | | | | | | 118 | 114 |
| PTC8[3] rxn w/$Co(NO_3)_2$ | | | | | | | | | | |
| ptc8-1 | 5.30 | | | | | | 0.745 | 10.44 | 123 | 120 |
| ptc8-2 | 4.00 | | | | | | | | 137 | 126 |
| ptc8-3 | 10 | | | | | | 0.950 | 8.69 | 108 | 105 |
| ptc8-4[4] | 3.00 | | 8.2144 | 1.093 | | | | | | |
| PTC10 rxn w/$LiNO_3$ and $Al(NO_3)_3$ | | | | | | | | | | |
| ptc10-1 | | 0.14 | 8.2112 | 1.109 | 19.912 | 0.1496 | | | 97 | 99 |
| PTC11 rxn w/$ZrOCl_2$ | | | | | | | | | | |
| ptc11-1 | | | 8.2217 | 1.056 | | | 0.926 | 7.75 | 121 | 119 |
| PTC12 rxn w/$LiNO_3$/ $Co(NO_3)_2/Al(NO_3)_3/NiCO_3$ | | | | | | | | | | |
| ptc12-1 | | | | | | | | | 89 | 90 |
| PTC14 $CoCO_3$ | | | | | | | | | | |
| ptc14-1 | 4 | | | | | | | | 120 | 116 |

[1]TGA of mixture 378° C. transition end wt. loss at 475, 98.27%
[2]TGA of mixture shows transition at 370° C. end at 430° C. (2% wt. loss)
[3]TGA of mixture end wt. losses at 500° C., transitions at 100, 210, 320, and 434° C. end 540° C., 97.25%
[4]$Co(NO_3)_3$ pre-dissolved in methanol

TABLE 3

| Material | Rotary Oven Temp C | Residence Time min | Feed Rate g/min | Surface Area | Capacity 1st | Capacity 2nd | % Oxygen Depletion | $Li_x$ Content |
|---|---|---|---|---|---|---|---|---|
| 2% Nickel Phosphate | 750 | 36 | 300 | 0.5252 | 120 | 120 | 0 | 1.029 |
| 2% Cobalt Phosphate | 775 | 36 | 100 | 0.5781 | 118 | 119 | 0.0002 | 1.02 |
| 4% Cobalt Nitrate | 700 | 18 | 100 | 0.6287 | 123 | 118 | 0 | 1.069 |
| 1% Cobalt Hydroxide | 650 | 36 | 100 | 0.8056 | 115 | 115 | 0 | 1.065 |

While not wishing to be held to any particular theory it is believed that the cationic metal species which remain after decomposition of the metal compound provide metal-containing cations bound to the oxygen of the lithium manganese oxide at the surface of the lithium manganese oxide. This is different from forming a simple metal oxide layer over the surface. The cationic metal species which remain after decomposition of the metal compound, are not thought to simply remain on the LMO surface as positively charged ions because as such they would leave during extraction of lithium during cell operation upon subsequent activation of the cells. Instead, the positively charged ions are thought to be incorporated into, in or on the outside layer of the spinel structure. The preferred metals are first row transition metals such as titanium (Ti), vanadium (V), chromium (Cr), manganese (Mn), iron (Fe), cobalt (Co), nickel (Ni), copper (Cu), and zinc (Zn). These metals are thought to form ions which coordinate well with the oxygen at the surface of the spinel because they have a size roughly comparable to the Mn. Some second row transition metals may also be included and are selected from zirconium (Zr), molybdenum (Mo), palladium (Pd), cadmium (Cd), tungsten (W), and platinum (Pt). In addition, other non-transition-metal metals are used. They include those metals capable of a +3 valence state such as aluminum. Other metals such as tin are also possible.

It is thought that upon being heated, the metal compound, when it reaches the melting point, actually decomposes and leaves the metal or metal-containing group (species) behind. In one embodiment, the metal compound is a salt. Here, the anion is the component which is driven off by heat. A variety of anions are usable to provide decomposition of the compound at temperature ranges described herein. Examples include chlorine, carbonate, and nitrate. The metal is dispersed preferably uniformly on the surface of the spinel, and reduces the surface area. In an optimized condition, the remaining metal provides an essentially complete coating to provide as low a surface area as possible. However, excess deposited metal or metal species is undesirable because the added weight adversely affects the specific capacity of the cathode active material. It is preferred to use a metal salt, preferably a transition metal salt, that melts or essentially reacts in the presence of the LMO to achieve decomposition at a preferred temperature of about 400° C. to about 500° C. Although, the manner in which the metal cation is incorporated on the outside layer of the spinel structure is not clearly defined, its presence has been documented by analysis as per the Examples and Table 2. The surface-area-reducing effect is clearly evident. The fact that the metal compound decomposition does not result in an increase in surface area is an indication that it does not result in formation of a separate metal oxide compound at the surface. This is because the formation of a separate metal oxide compound would, as understandable by those skilled in the art, result in an increase in surface area. Therefore, it is clear that the metal is somehow incorporated into the spinel structure most likely by reacting with the particle terminus groups of carboxyl, carboxyllic, or hydroxyl groups. Based on scanning electron microscope (SEM) the surface of the particles looks polished. Continued heating beyond this is not desired since it leads to metal ion diffusion away from the surface and cause the surface area to increase. While not wishing to be held to any theory, it appears that the metal to some extent goes down on the outer layer of the spinel crystal attached to an oxygen of the outer layer of the spinel at the terminals of lattice where the spinel ends in alternating two oxygens and one manganese. It is thought that the most likely place for the metals to attach is to the terminal oxygens of the lattice as evidenced by the fact that it is not possible to simply rinse away the metal cations after their deposition thereon from decomposition of the metal compound. If the metal cation were merely a plain ion, it would be possible to simply rinse it off.

The beneficial result of the deposition of metal at the surface is clear from the data described above; it reduces the surface area of the overall spinel, and each example demonstrates lower surface area than the initial untreated spinel. Each treated example also shows better ion transport, less corrosion, and better cycling. In addition, the unexpected advantage of extra capacity is achieved. This appears to provide the ability to access more of the lithium. In other words, it is possible to obtain more capacity from the LMO after treatment than would have been possible from the LMO starting material, as-received from the vendor, and conventionally made. From the experiments described above, it is clear that the capacity always exceeds that of the untreated spinel regardless of what metal is used. Therefore, one thing is clear, that it is very important to incorporate the metal into the spinel. The size of the incorporated metal is related to its ability to achieve beneficial results. Therefore, first row transition metals are preferred.

The anion of the metal compound is important only to the extent that the compound itself must be decomposable at a temperature below which the original spinel starts losing oxygen or the lithium becomes too mobile. Therefore, the lower the temperature at which the anion portion decomposes, the more attractive is its use. Metal compounds which are metal oxides are known to be very stable and only decomposable at very high temperatures on the order of 900° C. In the present invention, the compound decomposes at a temperature less than 900° C., desirably less than 800° C., more desirably less than 750° C., most desirably less than 650° C., and preferably less than 600° C. More preferably the metal compound decomposes at a temperature less than 550° C. Some metal compounds are even capable of decomposing at a temperature as low as about 300° C. to about 350° C. A decomposition temperature in a range of about 400° C. to about 500° C. is suitable. The metal compounds, for use in the invention, may be pre-screened by determining their melting point, their decomposition temperature, and by conducting thermal gravimetric analysis (TGA).

In the case of compounds having more that one metal cation it is possible to deposit more than one metal onto the surface. This occurred, for example, when using lithium aluminum chloride. In the case of a compound such as nickel carbonate, for example, the carbonate anion would decompose leaving only the nickel. The effect of the depositing of metal cations on the surface of the LMO is reduced surface area which results in less corrosion of the manganese and better cycling. By corrosion of the manganese it is meant that manganese ions are oxidized and can eventually dissolved away during operation of the battery to the harsh conditions of battery operation. The addition of the metal cation of the invention has the beneficial effect of reducing corrosion of the manganese. The treated lithium manganese oxide of the invention is characterized by having extra capacity which seems to cause the ability to access more of the lithium or operation of the battery. Thus, there seems to be an enhancement of lithium ion transport and/or removal from the cathode. As stated earlier, regardless of the metal used a beneficial effect was observed, and capacity exceeds that of the base LMO.

It was noticed that metal compounds decompose very close to their melting point. It was also observed that the decomposition of the metal compound additive occurs at a temperature lower in the presence of the spinel than would occur if the metal compound additive was simply decomposing by itself. It was observed that some metal salts such as the acetates readily decompose if heated by themselves. For other metal salts, their decomposition seems to be in conjunction with the lithium manganese oxide being present. Therefore, decomposition is facilitated thereby. It was observed that lithium carbonate melts at about 750° C. In the presence of the spinel LMO, the lithium carbonate decomposed at a temperature as low as about 650° C., showing that decomposition of the metal compound is altered by the presence of the starting material LMO spinel. It was observed that the metal cations at the surface are clearly not a metal coating and they somehow combine with the surface charge or atomic bonding, or ionic complex with the lithium manganese oxide. Therefore, the result is a decomposition product of the metal compound that forms in the presence of the LMO and after such decomposition reaction, the surface of the LMO loses some of its porosity. Under a scanning electron microscope (SEM) LMO particles treated with aluminum nitrate looked essentially polished demonstrating the surface area was lowered. It appears that in the process of decomposition the metal compound acts as a fluxing agent while the decomposition reaction is ongoing because some of the gases given off during decomposition uniquely polish the surface of the LMO. In the case of a chlorine or nitrate compound, chlorine or nitric oxide gas is given off as a reaction occurs, which reduces the terminal groups, the bound water and causes other related results. Therefore, decomposition gases reduced the terminal groups and the bound water within or on the spinel itself. As a result, the preferred anions in the metal compound are those that work best as flux agents. This means they have a greater mobility to move through and affect any porosity of the particles. This mobility also results in covering as much of the free surface area as possible to cause a surface reduction effect. It is evident that it is desirable to drive decomposition reaction to essentially full completion.

Advantageously, these beneficial effects are achieved in atmospheric conditions. Thus, metal cation of the metal compound effectively assumes a desired oxidation state for being maintained at the surface of the LMO while the reaction is conducted simply in air. Enhanced oxygen content may be beneficial, however, an oxidizing air environment was adequate. Another advantageous feature of the method of the invention is that the rate of heating and the rate of cooling do not appear to be critical. However, it is preferred that the synthesis be conducted at less than 600° C. Therefore, it is possible to simply heat the metal compound and the LMO in an oven and at the desired temperature for the desired amount of time and then permit it to cool. The added metal results in a small dilution effect with respect to the atomic weight proportion of the lithium. In a conventional starting material spinel the amount of lithium initially is expected to vary between $Li_xMn_2O_4$, where x is 1.02 to 1.08. In the case where the added metal compound does not contain lithium, then the atomic proportion of lithium in the final treated product will be lessened. If the metal compound itself contains lithium the atomic proportion of lithium and the final product will vary slightly depending on the relative weight of the lithium and other metal cations in the added metal compound.

Importantly, by the methods of the invention it is possible to achieve the beneficial aspects of enhanced capacity, reduced loss of capacity during cycling, reduced surface area, and stabilizing of the LMO against corrosion, without changing the basic spinel structure of the original LMO compound as evidenced by no major shifts in the x-ray pattern of the treated LMO as compared to the untreated LMO. This is thought to be because the added metal produces a passivation layer around the LMO particles to provide stability. The manganese alone is not able to produce such a passivation layer. This distinguishes the lithium manganese oxide from other metal oxides such as lithium cobalt oxide and lithium nickel oxide which are known to be capable of producing a passivation layer.

The methods of the invention are different from other approaches to attempting to improve performance of the LMO. The most common approach is to attempt to sinter the LMO at high temperature to achieve a more crystalline product by heating to about 800° C. The method of the present invention avoids sintering which has certain disadvantages including oxygen depletion. The present method also avoids forming $Li_2MnO_3$ which has been here found to be undesirable because of delithiation instabilities during discharge.

The amount of additive metal compound necessary to achieve the beneficial results is not large. The amount added is determined by the amount of surface area reduction desired and the amount effective to essentially polish the surface and plug the porosity and to stabilize against corrosion. Therefore, a surface-area-reducing amount is all that is required. Based on the experiments described hereinabove, metal compound additions on the order of 5 wt. % resulting in on he order of 2 wt. % metal deposited on the surface provided surface reduction effect on the order of 20–30%. Further optimization is a matter of choice. It is thought that metal compound additions greater than about 10 wt. % resulting in deposited metal on the order of 4 wt. % is the maximum amount desirable.

In summary, metals, and preferably transition metals, are used to stabilize the crystal structure of the spinel. This surface treatment lowers the surface area of the LMO and improves high temperature performance. In the case of transition metal treatment, the capacity was increased each time. With optimization of the amount of additive and treatment conditions, the resulting materials approach the theoretical capacity of nominal $Li_1Mn_2O_4$ at 140 milliamp hours per gram. This is particularly significant since all LMO with high capacity (or lithium content×approaching 1) suffer from very significant capacity fading during cycling even at room temperature. In contrast, the LMO material treated with metal salts and preferred transition metal salts of the invention have demonstrated the benefit of high capacity and small capacity fade even at high temperature cycling at about 60° C.

The treated LMO is prepared by heating a mixture of LMO and a metal compound for a period of time and at a temperature sufficient to cause interdiffusion of excess lithium from the LMO spinel, and metal cation from the metal compound, into an interfacial layer thereby creating a new compound of spinel-like structure, possessing reduced surface area, increased capacity, and improved thermal stability. The heating is preferably conducted to cause complete reaction of the metal compound into the surface of the spinel, allowing for the interdiffusion of excess lithium from the spinel into the newly formed surface, thereby creating an improved spinel-like structure having the advantages stated above. Prior to reaction, the metal compound powder and the lithium manganese oxide powder may be mixed together as solids and then reacted. Alternatively, prior to reaction, the metal salt can be dissolved in a suitable solvent, and the LMO thoroughly wetted by the solution before reaction to ensure near homogeneous dispersion of the additive. Advantageously, the reaction may be conducted in ambient air. The atmosphere does not need to be oxygen enriched at the temperatures described here, but inert atmosphere is not recommended. The metal compounds are preferably selected to decompose at a temperature less than 850° C., desirably less than 800° C., more desirably less than 750° C. and to melt at temperatures less than those stated immediately earlier. Other metal compounds, with higher melting points and/or decomposition temperatures, are still able to react with LMO at or below the immediately preceding temperatures and they react at the lower temperatures described herein. Therefore, the criterion is reaction with the spinel at temperatures less than 850° C., desirably less than 800° C., more desirably less than 750° C., by melting and/or decomposing in the presence of the spinel LMO. The preference is to cause reaction at a temperature which does not cause spinel oxygen deficiency to become a problem. Experiments showed that even at 750° C., reaction with phosphate salts did not produce any measurable oxygen deficiency, that is, less than 0.01%.

It appears that for many of the additive metal salts, the decomposition product is primarily the metal cation. This will bond to the spinel structure via the terminal oxygens of the spinel. During normal synthesis of spinel LMO, the terminal oxygen is usually attached to a proton (O—H group). This is the most likely position of the metal cation, that is, replace the proton. Depending on its valence, the metal species can include both the metal cation and an additional oxygen atom. Alternatively, not all additives decompose completely to the metal cation. For example, the phosphate salts retain their $PO_4$ groups. The end effect is lowered surface area of the treated spinel, improved capacity, and improved high temperature cycling. The temperature needed for the decomposition synthesis described here is advantageously relatively low, at 600° C. or less. Temperatures on the order of 350° C. to 450° C. are adequate for many of the salts used here. The lower decomposition synthesis temperature eliminates or significantly reduces the occurrence of oxygen deficiency and/or the production of $Li_2MnO_3$. Oxygen deficiency is considered a crystal defect and to be avoided in spinel synthesis. Impurities such as $Li_2MnO_3$ appear prone to decomposition in electrolytes typically used in lithium polymer batteries. Impurities in cells have proven to shorten the life especially during operation at temperatures above ambient.

The results of the process of the invention were compared to merely heating spinel LMO without any additive. In this comparative test, no surface area change was observed unless heating was conducted to the point where sintering occurred, on the order of over 800° C. No improvement in performance was observed. Thus, the additives and methods of the invention clearly demonstrated effectiveness in reduced surface area, increased capacity, and improved high temperature performance.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

What is claimed is:

1. A method of treating particles of spinel lithium manganese oxide which comprises the steps of: (a) forming a mixture consisting of said lithium manganese oxide particles intermingled with particles of one or more metal compounds wherein said metal compound includes at least one metal selected from the group consisting of transition metals, non-transition metal metals having a +3 valence state, and mixtures thereof; and (b) heating said mixture for a time and at a temperature sufficient to form a reaction product of the metal compound and the lithium manganese oxide at the surface of each said particle.

2. The method of claim 1 wherein said heating step is conducted in an air atmosphere.

3. The method of claim 1 wherein heating is conducted at a temperature in the range of about 200° C. to about 800° C.

4. The method of claim 1 wherein the heating is conducted for a time of about ½ hour to about 6 hours.

5. The method of claim 1 wherein the amount of metal compound contained in the mixture of lithium manganese oxide and metal compound is from about 0.5% to about 10% by weight of said total mixture.

6. The method of claim 1 wherein the reaction product is a decomposition product of the metal compound bound to the terminal oxygens of the lithium manganese oxide at the particle surface.

7. The method of claim 1 wherein said metal compound is selected from the group consisting of chlorides, nitrates, sulfates, acetates, carbonates, oxides, dichloride oxides, phosphates, hydroxides, and ammonium metal salts.

8. The method of claim 1 wherein said metal compound is selected from the group consisting of aluminum nitrate, ammonium aluminum sulfate, chromium acetate, ammonium chromate, nickel carbonate, cobalt nitrate, chromium oxide, zirconium dichloride oxide, lithium aluminum chloride, cobalt carbonate, cobalt phosphate, nickel phosphate, cobalt hydroxide, copper sulfate, and nickel nitrate.

9. A method of treating particles of spinel lithium manganese oxide which comprises the steps of: (a) forming a mixture consisting of said lithium manganese oxide particles intermingled with particles of one or more non-lithium-containing metal compounds wherein each said metal compound includes a metal selected from the group consisting of transition metals, non-transition metal metals having a +3 valence state, and mixtures thereof; and (b) heating said mixture for a time and at a temperature sufficient to form a reaction product of the metal compound and the lithium manganese oxide at the surface of each said particle.

10. The method of claim 9 wherein said heating step is conducted in an air atmosphere.

11. The method of claim 9 wherein heating is conducted at a temperature in the range of about 200° C. to about 800° C.

12. The method of claim 9 wherein the heating is conducted for a time of about ½ hour to about 6 hours.

13. The method of claim 9 wherein the amount of metal compound contained in the mixture of lithium manganese oxide and metal compound is from about 0.5% to about 10% by weight of said total mixture.

14. The method of claim 9 wherein the reaction product is a decomposition product of the metal compound bound to the terminal oxygens of the lithium manganese oxide at the particle surface.

15. The method of claim 9 wherein said metal compound is selected from the group consisting of chlorides, nitrates, sulfates, acetates, carbonates, oxides, dichloride oxides, phosphates, hydroxides, and ammonium metal salts.

16. The method of claim 9 wherein said metal compound is selected from the group consisting of aluminum nitrate, ammonium aluminum sulfate, chromium acetate, ammonium chromate, nickel carbonate, cobalt nitrate, chromium oxide, zirconium dichloride oxide, cobalt carbonate, cobalt phosphate, nickel phosphate, cobalt hydroxide, copper sulfate, and nickel nitrate.

* * * * *